United States Patent [19]
Nicol

[11] 3,966,230
[45] June 29, 1976

[54] BICYCLE FRAME

[75] Inventor: John Nicol, Palos Verdes Peninsula, Calif.

[73] Assignee: Teledyne, Inc., Los Angeles, Calif.

[22] Filed: Nov. 1, 1974

[21] Appl. No.: 520,043

Related U.S. Application Data

[63] Continuation-in-part of Ser. No. 455,579, March 28, 1974, abandoned.

[52] U.S. Cl............................................. 280/281 R
[51] Int. Cl.²........................................ B62K 3/04
[58] Field of Search............................ 280/274, 281

[56] References Cited
UNITED STATES PATENTS

| | | | |
|---|---|---|---|
| 1,998,994 | 4/1935 | Lewis | 280/281 |
| 2,443,008 | 6/1948 | Kraeft, Jr. | 280/274 |

FOREIGN PATENTS OR APPLICATIONS

| | | | |
|---|---|---|---|
| 79,371 | 1950 | Czechoslovakia | 280/281 |
| 7,783 | 1895 | United Kingdom | 280/281 |
| 579,409 | 8/1946 | United Kingdom | 280/281 |
| 461,692 | 5/1935 | United Kingdom | 280/281 |
| 657,011 | 9/1951 | United Kingdom | 280/281 |

*Primary Examiner*—M. H. Wood, Jr.
*Assistant Examiner*—Jack D. Rubenstein
*Attorney, Agent, or Firm*—Ronald W. Reagin

[57] ABSTRACT

A bicycle frame of relatively large diameter tubing formed of a light weight, high strength metal tubing, such as titanium, is provided with integral stiffeners at the top of the seat tube, the bottom of the down tube and the top of the fork blades. In larger sizes of frames, stiffeners may also be included at the bottom of the seat tube and at the top of the down tube. The placement of stiffeners at these selected locations results in overall frame stiffness characteristics not previously considered achievable without substantial increase in the weight of the frame. As an additional feature, the enlarged diameter of the down tube is reduced at appropriate locations to enable standard gear shift lever and control cable fittings to be used.

1 Claim, 3 Drawing Figures

U.S. Patent  June 29, 1976  3,966,230
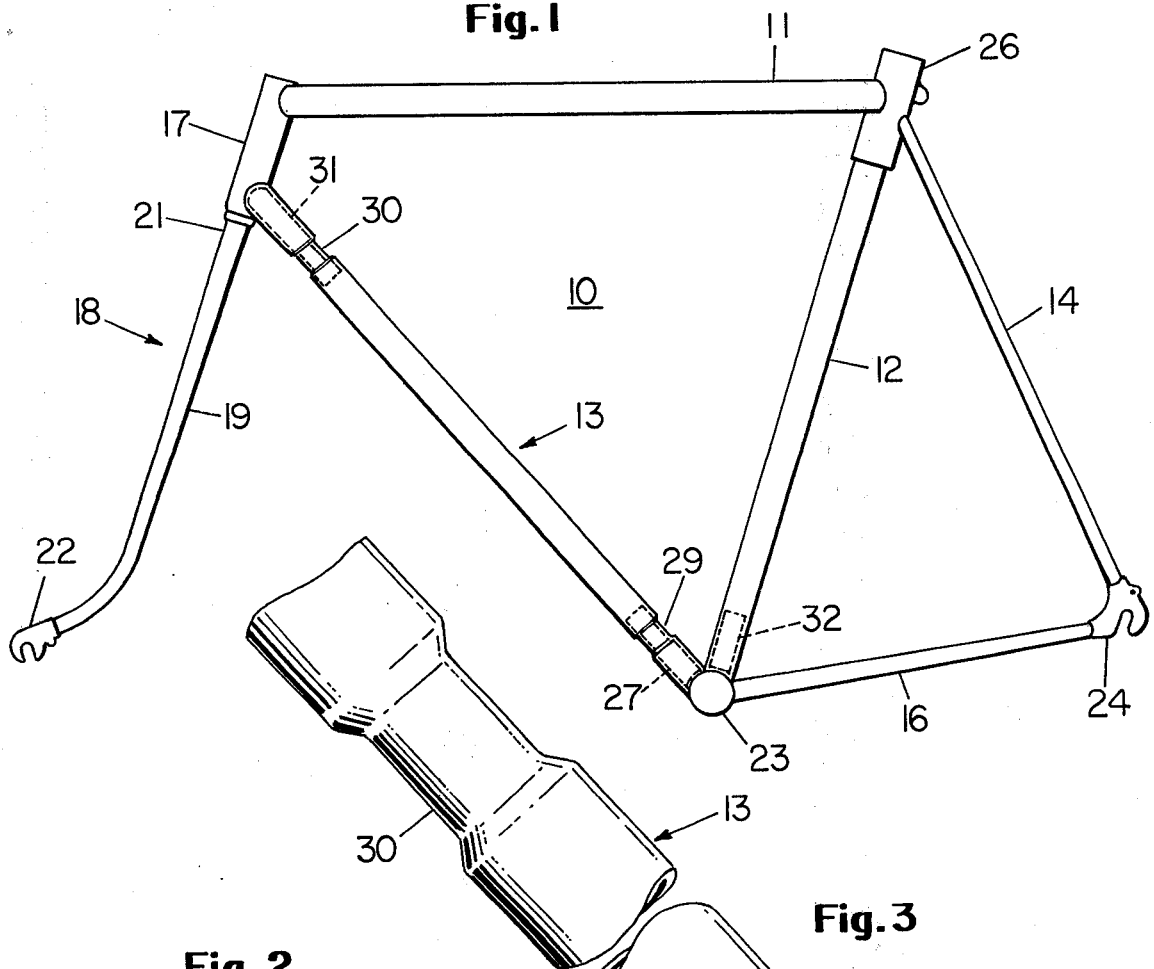
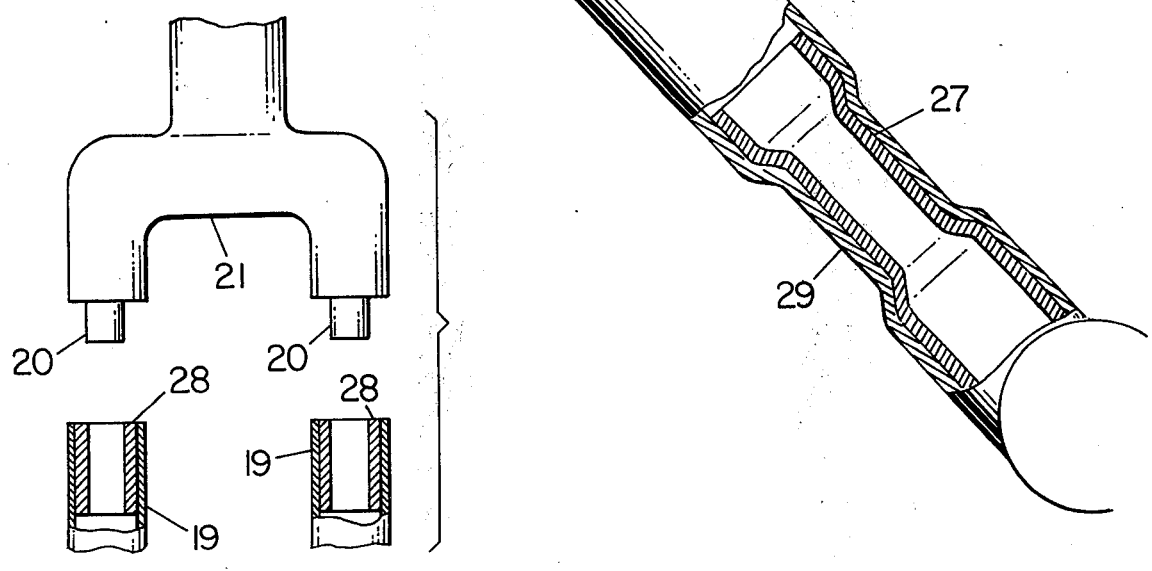

BICYCLE FRAME

This application is a continuation in part of application Ser. No. 455,579, filed Mar. 28, 1974, and now abandoned.

BACKGROUND OF THE INVENTION

The achievements of the bicyclist over any particular course or track are limited by his form and style, by his personal physical characteristics and by the characteristics of his bicycle. The weight of the bicycle has long been recognized as an important factor in the performance equation, and high performance bicycles are generally designed to have the minimum weight consistent with the required size and strength. The conventional "diamond" bicycle frame, in use for many years, has been intensively studied for the purpose of weight reduction to make possible light weight steel frames having the strength and rigidity to support the rider as the wheels roll over surfaces which may be rough or uneven, and to transmit the forces of pedaling, steering and braking. Each high performance frame design is the product of compromises based on the weight and structural characteristics of a particular metal or alloy, and of the diameter and wall thickness of the tubes making up the frame. A high quality, light weight alloy steel frame in the standard size range will generally weigh at least 6 to 7 pounds, and all efforts to achieve further weight reduction collide head-on with the fact that lighter frames are prone, in vigorous use, to bend beyond the elastic limits of their component tubes and to be permanently deformed. Such deformation usually renders the bicycle useless for its intended purpose and may make it dangerous to use under the stress of competition riding.

Previous bicycle enthusiasts have explored the possibilities of making frames out of materials other than steel, and frames of light weight, high strength metal such as titanium have been built. Titanium, at 0.16 lb/cu.in. weighs 45% less than steel at 0.28 lb/cu.in. and has a considerably higher strength to weight ratio. While titanium metal is, pound for pound, appreciably stronger than steel, it is also much more flexible. The tubes of which titanium bicycle frames have been fashioned have a lower modulus in bending than steel tubes, with the result that the frames have tended to be overly flexible or "whippy" under the stress of vigorous riding. In order to stiffen the titanium frames to make the bicycle more ridable, designers have increased the diameters and/or wall thickness of the titanium tubes. However, this approach results in the addition of titanium metal which is not otherwise required for the strength of the frame, reduces the weight advantage which is the sole reason for using titanium in the first place, and still does not provide the desired riding characteristics.

For the foregoing reasons, it is desirable to provide means for reducing the flexibility of a titanium bicycle frame without adding appreciably to the minimum weight of the metal required for the basic strength of the frame.

SUMMARY OF THE INVENTION

In accordance with the principles of the invention, a bicycle frame is constructed of relatively flexible, light weight, high strength metal tubing, such as titanium tubing. The metal tubing which forms each section of the frame has a generally uniform diameter and wall thickness, and consequently has a substantially uniform transverse flexibility except in certain specially selected regions where additional stiffness is provided by increasing the effective thickness of the tube walls. Extra wall thickness, pursuant to the invention, is placed at the top of the seat tube, at the bottom of the down tube, and at the top of the front fork. Extra thickness may also be placed at the top of the down tube and at the bottom of the seat tube, although the improvement resulting from stiffening the two latter locations is less than that achieved by stiffening the three former sites.

In the preferred embodiment of the invention, extra stiffness at the selected locations is achieved by inserting relatively short tubular metal sections into the lower end of the down tube and into the upper ends of the front fork blades. The inserts may be permanently affixed by a press fit or by welding the larger and smaller tubes together at the open end, by swaging, or by a combination of these techniques. Extra stiffness at the top of the seat tube is preferably achieved by a metal sleeve affixed by press fit and welding. The thickness of the metal sleeve and the metal inserts is comparable to the thickness of the tube being stiffened, so that the thickness of the tube walls is approximately doubled at the chosen locations.

Because the titanium metal down tube will typically have a diameter somewhat greater than that of the steel down tube of a conventional bicycle frame, the standard size shift lever brackets and control cable guides may not be used. Furthermore, titanium frames are presently relatively expensive and are likely to remain so. As high cost "state of the art" machines, they are made in relatively small numbers and may even be custom made for individual cyclists, using a variety of tube sizes to meet special requirements. In order to make the widely available standard fittings useable with titanium frames incorporating tubes of non-standard diameter, the enlarged down tube may be swaged down near the top and bottom ends where the shift levers and cable guides are usually attached, to the standard diameter of a conventional steel frame tube. The reduced diameter is advantageously formed over the stiffening insert at the bottom of the down tube, which is yet more firmly affixed to the inside of the tube by the swaging operation. If a stiffening insert is used at the top end of the down tube, the reduced diameter is preferably formed over it with a similar beneficial effect.

The use of tube stiffening wall thickness doublers at the particular locations taught herein enables a bicycle frame to be made of a strong light weight but flexible material such as titanium, and yet to achieve a high degree of frame rigidity while making maximum use of the weight advantage of the material. It is believed that the stiffeners not only reduce the flexibility of the frame members at the selected positions but of the frame as a whole, and also damp the tendency of the frame to vibrate when driven by the forces applied by the rider or by the impact of wheels on an uneven surface. The invention has been realized in a bicycle frame of commercially pure titanium metal which weighs approximately 3½ lbs, a weight reduction of about 40% from the lightest conventional steel frame. This result is achieved in a frame of great strength and rigidity, and having outstanding riding characteristics.

BRIEF DESCRIPTION OF THE DRAWINGS

FIG. 1 depicts a bicycle frame fabricated of light weight, high strength, hollow tubing such as titanium tubing, and incorporating tubular inserts for additional stiffness at selected locations.

FIG. 2 is a detailed front view of the front wheel fork of a bicycle frame embodying the invention.

FIG. 3 is a detailed view of a down tube of a bicycle frame such as that shown in FIG. 1, in which the diameter of the tube has been reduced over short sections near the ends to accommodate standard gear shift lever and control cable retaining fittings.

DETAILED DESCRIPTION OF THE PREFERRED EMBODIMENT

The bicycle frame 10 illustrated in FIG. 1 is of the familiar "diamond" type comprising a top bar 11, a seat tube 12, a down tube 13, and a pair each of seat stays 14 and chain stays 16. The front end of top bar 11 and the upper end of down tube 13 are joined to a steerer or head tube 17. A front wheel fork 18 is provided having a pair of tubular form blades 19 attached to a fork crown 21, the top of which fits rotatably into steerer tube 17. The lower ends of fork blades 19 carry front wheel drop-outs 22. The rear end of top bar 11 and the top end of seat stays 14 are joined to the top end of seat tube 12, while the bottom end of down tube 13, the bottom end of seat tube 12 and the front ends of chain stays 16 are joined to a bottom bracket 23 which is adapted to receive the pedal spindle assembly, not shown. The bottom ends of seat stays 14 and the rear ends of chain stays 16 are joined to rear wheel dropouts 24.

In conventional bicycle frames, the tubes are joined by welding or brazing with welding being commonly used on heavier, less expensive frames while the higher quality, light weight frames use a lugged and brazed construction. The tubing of the best bicycle frames hitherto available is "butted" with the tube walls being slightly thicker at the ends than in between. The extra thickness at the ends of butted tubing compensates for the loss of strength in that region due to annealing of the metal when it is brazed into the lugs.

According to the invention, however, frame 10 is fashioned of hollow tubes of a light weight, high strength material, such as titanium, which are appreciably more flexible than steel tubes of similar configuration. The steel tubes of conventional light weight frames are typically 1 inch in diameter for the top bar and seat tube and 1⅛ inches for the down tube. Wall thickness of the steel tubes may range from about 0.022 inch to 0.040 inch, with the butted ends, when used, being about 0.010 inch thicker than the middle portions. Experience has shown that a frame made of, for example, titanium tubing in the diamters and wall thicknesses commonly employed for steel frames, would be so flexible as to be considered virtually unridable by enthusiasts of competitive cross-country or track bicycling. Attempts to overcome the "whippiness" of such frames by increasing the diameters or the wall thickness of the tubes have dissipated a portion of the weight saving realized by using titanium but still have not resulted in frames acceptable to riders who demand high performance of their bicycles.

I have discovered that frames of relatively flexible light weight, high strength tubing, such as titanium tubing, can be given the degree of rigidity desired by competitive cyclists, by reducing the flexibility of certain portions of particular tubular frame members with respect to other portions. Thus, in frame 10 illustrated in FIG. 1, the flexibility of the top portion of seat tube 12 is reduced with respect to the middle and bottom portions by means of an external sleeve 26 which fits over and is affixed to the top of seat tube 12, as by welding or swaging. Seat tube 12 has a nominally uniform wall thickness, to which the wall thickness of sleeve 26 is comparable. Thus, the effective wall thickness of the upper portion of seat tube 12 is approximately doubled over a length of, for example, 3 inches.

The bottom end of down tube 13 of frame 10 is reduced in flexibility with respect to the top and middle portions by means of a tubular mandrel or insert 27 fitted within and affixed to the bottom of down tube 13. Again, the wall thickness of the insert is comparable to that of tube 13 itself, so that the effective wall thickness of the lower several inches of down tube 13 is approximately doubled.

A third location where the stiffness of the tubular frame members is increased pursuant to the invention is at the top ends of the fork blades 19. In the illustrative embodiment, tubular wall thickness doublers 28 fit within and are affixed to the blades 19 at the top ends to reduce substantially the flexibility of blades 19 over a length of 1½ inches to 2 inches adjacent the top ends where the blades are joined to fork crown 21.

When the basic frame design is scaled upward to accommodate taller riders, the overall rigidity of the frame tends to decrease. I find it desirable, therefore, to provide larger frames with stiffening inserts 31 at the top of the down tube and 32 at the bottom of the seat tube. The inserts in these positions are preferably sized so that they effectively double the thickness of the tube walls over the selected region. Generally, however, I find that stiffening at these two positions is required only in frames which are 24 inches or larger as measured in the conventional manner along the seat tube.

Titanium frames embodying the invention are formed by welding the tubes together without lugs and without interpenetration of the tubes at the junctions. Instead, the end of a tube is shaped to fit the outer cylindrical surface of the tube to which it is to be joined, the tubes are placed together and the metal at the joint is melted, in a non-oxidizing environment. The molten metal flows together so that upon cooling the material at the junction is substantially integral and continuous. Fork blades 19 are joined to fork crown 21 with the aid of crown extensions 20 which are shaped to fit within inserts 28 where they act as locators during the joining process. While the junctions of the fork crown and the fork blades are between substantially coaxial members rather than between intersecting tubes as in the cases of the other joints described, the preferred form of joint is likewise smooth and integral. Since I prefer to use a commercial grade of fully annealed titanium tubing, there is no loss of strength near the junction regions due to heating of the metal during formation of the joint. For this reason, butted tubing is not required and a strong smooth joint is formed having an exceptionally pleasing appearance.

It has been found that a desirable relation between the flexibilities of the various parts of tubular titanium frame members results when the top bar and seat tube are 1⅛ inches in diameter and the down tube is 1¼ inches in diameter. The wall thickness of the three main tubes is preferably about 0.032 inch to 0.035 inch. Because it is customary to make the down tube of steel bicycle frames 1⅛ inches in diameter, standard fittings for the gear shift lever and control cable are widely available to fit tubes of that size. It is desirable that such fittings be useable with the larger diameter tubes of titaniun frames embodying the invention. This may be accomplished by reducing the diameter of portions of 29 and 30 of the down tube 13 adjacent the top and bottom ends, as shown in FIG. 3. Such a down tube may be fabricated by inserting mandrel 27 and welding it to the open end of tube 13, which is then swaged over mandrel 27 to reduce it to a diameter of 1⅛ inches. The swaging operation fixes the insert 27 even more firmly in place, and the extra strength provided by the double thick tube wall is considered advantageous in a region of higher stress where the tube diameter changes. A similar swaging operation produces a 1⅛ inches diameter section 30 near the top of tube 13. However, as this has been found to be a region of less stress, the doubler is not required although one may be desirable in the case of larger sized frames, as has been discussed.

Although the invention has been described with particular reference to a specific illustrative embodiment, many variations and modifications are possible and may be made by those skilled in the art to which it pertains, without departing from its spirit and scope.

What is claimed is:

1. In a lightweight bicycle frame of the type including a tubular top bar having front and rear ends, a tubular set tube having top and bottom ends, a tubular head tube, a bottom bracket, and a tubular down tube, all of which are constructed of annealed titanium metal and which possess a combined weight of no more than four pounds, the improvement therein which includes:

a tubular sleeve of annealed titanium metal having an inner diameter slightly larger than the diameter of said seat tube and a wall thickness over a major portion thereof approximately equal to that of said seat tube and within the range of 0.032 inches to and including 0.035 inches;

said sleeve being fitted over and ensleevingly engaging a portion of said seat tube and extending from said top end of said seat tube to a predetermined short distance along said seat tube;

and wherein said tubular top bar is of a tubular diameter less than the diameter of said tubular sleeve and wherein said rear end of said top bar is of a cylindrical geometry concavely recessed from the end of said top bar for matingly engaging the cylindrical outer surface of said tubular sleeve, said rear end of said top bar further being butted up against and fusion bonded to said outer surface of said tubular sleeve to form an integral juncture therebetween;

and wherein said tubular down tube is of a hollow cylindrical shape of a predetermined outer diameter and bore and a wall thickness in the range of 0.032 inches to and including 0.035 inches and contains at least one radially inwardly deformed portion adjacent an end, said deformed portion defining a cylindrical surface of smaller diameter and smaller bore than the major portion of said tube and being of a short length;

and a tubular mandrel of annealed titanium material, said mandrel being of a wall thickness approximately equal to the wall thickness of said down tube and having first and second ends and having a length greater than the length of said deformed portion of said down tube;

said tubular mandrel having a radially inwardly deformed portion spaced from and located between the said first and second ends thereof;

said deformed portion of said mandrel defining a cylindrical surface of outer diameter almost equal to said inner diameter defined by said deformed portion of said down tube and of a length approximately equal to that length defined by said deformed portion of said down tube;

said mandrel being located inside said down tube with said deformed portion of said mandrel underlying and engaging said deformed portion of said down tube and with the remaining portions of said mandrel engaging the inner surface of said down tube.

* * * * *